(12) United States Patent
Laackmann

(10) Patent No.: US 7,893,832 B2
(45) Date of Patent: Feb. 22, 2011

(54) AUTHENTICITY TAG AND METHOD FOR OPERATING AN AUTHENTICITY TAG

(75) Inventor: Peter Laackmann, Munich (DE)

(73) Assignee: Infineon Technologies AG (DE)

( * ) Notice: Subject to any disclaimer, the term of this patent is extended or adjusted under 35 U.S.C. 154(b) by 1840 days.

(21) Appl. No.: 11/007,592

(22) Filed: Dec. 8, 2004

(65) Prior Publication Data

US 2005/0121898 A1 Jun. 9, 2005

(30) Foreign Application Priority Data

Dec. 8, 2003 (DE) ................. 103 57 196

(51) Int. Cl.
- G08B 13/14 (2006.01)
- H04Q 5/22 (2006.01)
- G06F 17/00 (2006.01)

(52) U.S. Cl. .................. 340/572.1; 340/10.1; 340/10.5; 340/568.1; 340/572.3; 340/572.7; 235/375; 235/385; 235/492

(58) Field of Classification Search ................ 340/10.1, 340/10.5, 568.1, 572.1, 572.3, 572.7; 235/375, 235/385, 492
See application file for complete search history.

(56) References Cited

U.S. PATENT DOCUMENTS

| | | | |
|---|---|---|---|
| 5,206,897 A | | 4/1993 | Goudreau et al. |
| 5,512,879 A | * | 4/1996 | Stokes ...................... 340/573.4 |
| 6,002,343 A | * | 12/1999 | Auerbach et al. ......... 340/10.41 |
| 6,025,780 A | | 2/2000 | Bowers et al. |
| 6,043,746 A | * | 3/2000 | Sorrells .................... 340/572.7 |
| 6,050,622 A | * | 4/2000 | Gustafson ............... 292/307 R |
| 6,104,295 A | * | 8/2000 | Gaisser et al. ........... 340/573.4 |
| 6,236,319 B1 | * | 5/2001 | Pitzer et al. .............. 340/573.4 |
| 6,268,795 B1 | | 7/2001 | Hadfield et al. |
| 6,346,886 B1 | * | 2/2002 | De La Huerga .......... 340/573.1 |
| 7,135,975 B2 | * | 11/2006 | Hoshina et al. .......... 340/572.1 |
| 7,204,425 B2 | | 4/2007 | Mosher, Jr. et al. |
| 7,323,998 B2 | * | 1/2008 | Girvin et al. ............. 340/572.9 |
| 7,388,493 B2 | | 6/2008 | Lerch et al. |

FOREIGN PATENT DOCUMENTS

| | | |
|---|---|---|
| DE | 199 11 709 A1 | 9/2000 |
| JP | 10324120 A | 12/1998 |

* cited by examiner

Primary Examiner—Benjamin C Lee
Assistant Examiner—Lam P Pham
(74) Attorney, Agent, or Firm—Dickstein Shapiro LLP

(57) ABSTRACT

An authenticity tag includes a carrier for attachment to an object, a plurality of electrically conductive areas and a controller attached to the carrier. The controller includes a detector for detecting an electrically detectable quantity at the electrically conductive area, a memory for storing a comparative quantity and a communicator for communicating at least one of the comparative quantity, the electrically detectable quantity detected and a result of a comparison of the electrically detectable quantity detected and the comparative quantity to the outside.

35 Claims, 5 Drawing Sheets

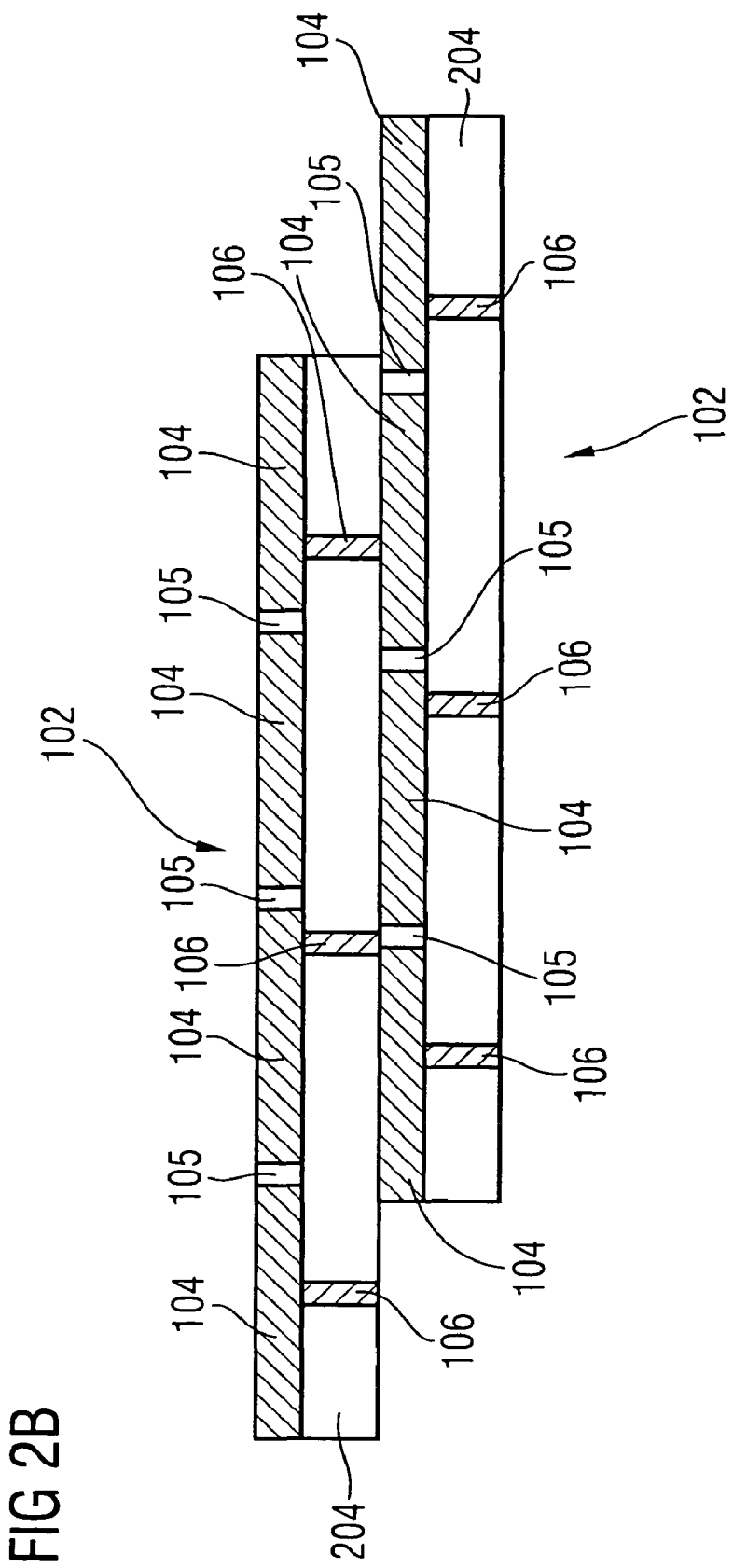

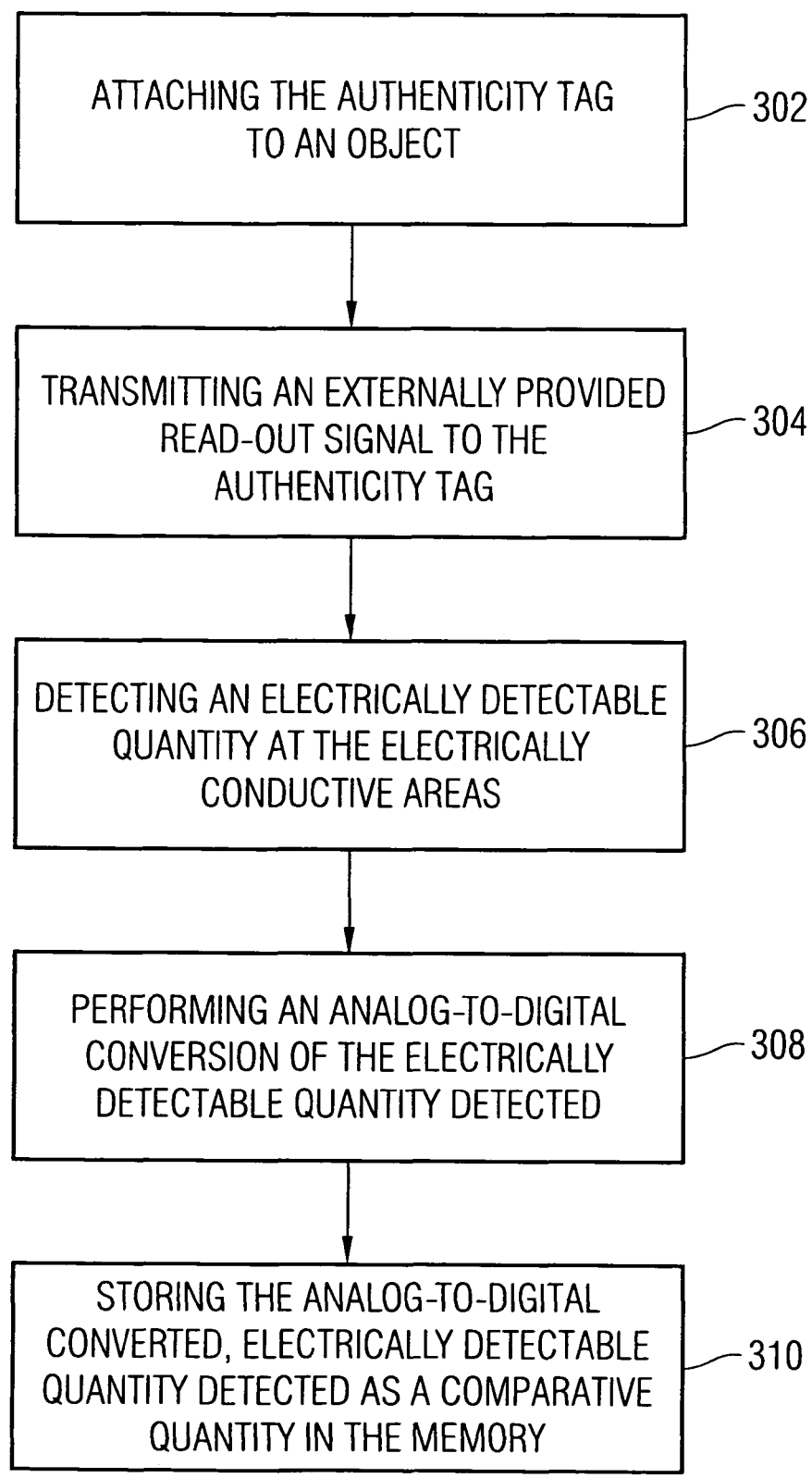

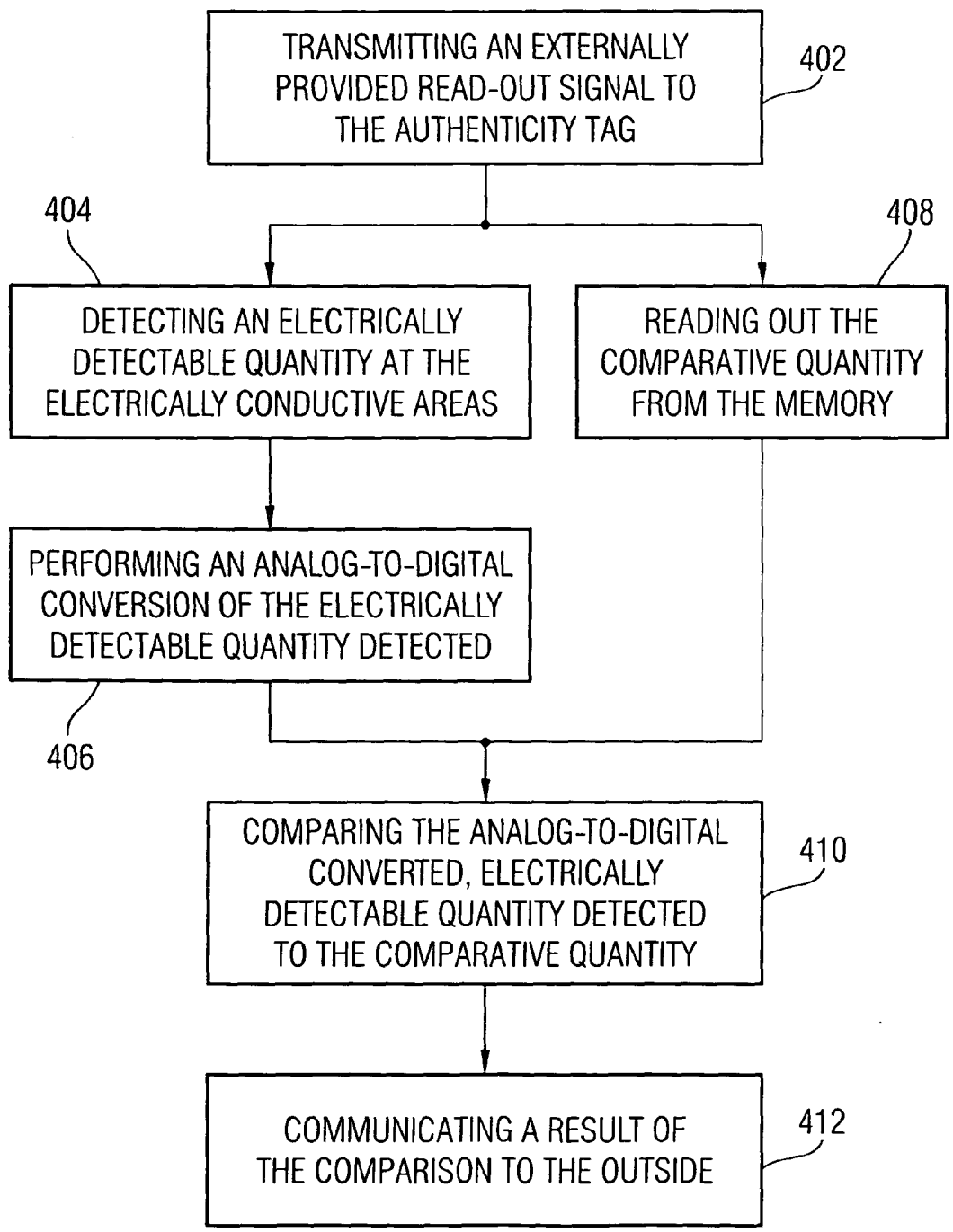

US 7,893,832 B2

AUTHENTICITY TAG AND METHOD FOR OPERATING AN AUTHENTICITY TAG

CROSS-REFERENCE TO RELATED APPLICATION

This application claims priority from German Patent Application No. 103 57 196.5, which was filed on Dec. 8, 2003, and is incorporated herein by reference in its entirety.

BACKGROUND OF THE INVENTION

1. Field of the Invention

The present invention relates to an authenticity tag by means of which it can be determined whether an original attachment of the authenticity tag has been altered. In particular, the present invention relates to an authenticity tag which can be realized using semiconductor devices.

2. Description of Related Art

In order to protect devices or packages having an identical appearance, so-called "tamper indicating seals" (=protective stickers) have been used until now. Stickers equipped with certain protective features (such as, for example, a holograph, etc.) and which are destroyed when trying to remove the seal, are thus attached to objects. This is mostly achieved by applying differently strong adhesive materials in several layers or divisions; when the sticker is removed mechanically it is to destroy itself. Toll vignettes for using Austrian or Swiss motorways are an example of such "temper indicating seals". These toll vignettes must be stuck directly to the windshield and tear when they are peeled off.

Stickers containing a memory chip (such as, for example, RFID=radio frequency identification tag) are also widespread.

It is of disadvantage that the memory chip of the "tamper indicating seal" cannot control whether the sticker is actually still on the product (i.e. the object) to which it has been attached originally or whether it has been peeled off by special tools. This is particularly problematic when a person buying a product is to be put into a position by means of the "tamper indicating seal" to check, by simple tools, the authenticity of the product offered to which such a "tamper indicating seal" has been attached. In this context, an authenticity tag for brand-name textiles could be cited as an example. Determining the authenticity of original spare parts in the automobile or aircraft industry and identifying the authenticity of packages, such as, for example, CD covers, are further examples of this.

SUMMARY OF THE INVENTION

It is an object of the present invention to provide a safe and, at the same time, simple way of checking the authenticity of a tag attached to an object.

In accordance with a first aspect, the present invention provides an authenticity tag including a carrier for attachment to an object, a plurality of electrically conductive areas and control means attached to the carrier. The control means includes means for detecting an electrically detectable quantity at the electrically conductive areas, a memory for storing a comparative quantity and means for communicating at least one of the comparative quantity, the electrically detectable quantity detected and a result of a comparison of the electrically detectable quantity detected and the comparative quantity to the outside.

In accordance with a second aspect, the present invention provides a method for operating an authenticity tag, the authenticity tag having a carrier for attachment to an object, a plurality of electrically conductive areas and control means connected to the carrier, the control means including means for detecting an electrically detectable quantity at the electrically conductive areas, a memory for storing a comparative quantity and means for communicating the comparative quantity and the electrically detectable quantity detected or a result of a comparison of the electrically detectable quantity detected and the comparative quantity to the outside, having the following steps: detecting an electrically detectable quantity at at least one of the electrically conductive areas; addressing the memory to read out a comparative quantity stored in the memory from the memory; and communicating at least the comparative quantity and the electrically detectable quantity detected or a result of a comparison of the comparative quantity and a version of the electrically detectable quantity detected to the outside.

In accordance with a third aspect, the present invention provides a device for tagging an object with an authenticity tag, the authenticity tag having a carrier for attachment to an object, a plurality of electrically conductive areas and control means connected to the carrier, the control means including means for detecting an electrically detectable quantity at the electrically conductive areas, a memory for storing a comparative quantity and means for communicating the comparative quantity and the electrically detectable quantity detected or a result of a comparison of the electrically detectable quantity detected and the comparative quantity to the outside, having: means for attaching the authenticity tag to the object; means for detecting an electrically detectable quantity at an electrically conductive area; and means for storing a version of the electrically detectable quantity detected as a comparative quantity in the memory.

In accordance with a fourth aspect, the present invention provides a method for tagging an object with an authenticity tag, the authenticity tag having a carrier for attachment to an object, a plurality of electrically conductive areas and control means connected to the carrier, the control means including means for detecting an electrically detectable quantity at the electrically conductive areas, a memory for storing a comparative quantity and means for communicating the comparative quantity and the detected, electrically detectable quantity or a result of a comparison of the electrically detectable quantity detected and the comparative quantity to the outside, having the following steps: attaching the authenticity tag to the object; detecting an electrically detectable quantity at at least one electrically conductive area; and storing a version of the electrically detectable quantity detected in the memory as the comparative quantity.

In accordance with a fifth aspect, the present invention provides a device for checking an authenticity tag, the authenticity tag having a carrier for attachment to an object, a plurality of electrically conductive areas and control means connected to the carrier, the control means including means for detecting an electrically detectable quantity at the electrically conductive areas, a memory for storing a comparative quantity and means for communicating the comparative quantity and the electrically detectable quantity detected or a result of a comparison of the electrically detectable quantity detected and the comparative quantity to the outside, having: means for comparing the comparative quantity and the electrically detectable quantity detected to obtain the result of a comparison; and means for checking the result of the comparison and for signaling an authenticity in a case in which the comparative quantity and the electrically detectable quantity detected are in a predetermined relation to each other.

In accordance with a sixth aspect, the present invention provides a method for checking an authenticity tag, the authenticity tag having a carrier for attachment to an object, a plurality of electrically conductive areas and control means connected to the carrier, the control means including means for detecting an electrically detectable quantity at the electrically conductive areas, a memory for storing a comparative quantity and means for communicating the comparative quantity and the electrically detectable quantity detected or a result of a comparison of the electrically detectable quantity detected and the comparative quantity to the outside, having the following steps: comparing the comparative quantity and the electrically detectable quantity detected in order to obtain the result of a comparison; and checking the result of the comparison and signaling an authenticity in a case in which the comparative quantity and the electrically detectable quantity detected are in a predetermined relation to each other.

In accordance with a seventh aspect, the present invention provides a computer program having a program code for performing one of the above-mentioned methods when the program runs on a computer.

The present invention is based on the finding that an increase in tampering safety can be obtained by the fact that it is possible by means of such an authenticity tag to couple several of the electrically conductive areas to one another when attaching the authenticity tag to the object. An electrically detectable pattern (i.e. an electrical pattern) between two respective ones of the plurality of electrically conductive areas can thus be established by such a coupling of several electrically conductive areas when attaching the authenticity tag to the object. This electrically detectable pattern can be detected as an electrically detectable quantity by the means for detecting and stored in the memory in a version as a comparative quantity. If the authenticity tag is removed from an original object to which it has been mounted and is attached to another object, the electrically conductive areas of the authenticity tag, when attaching the authenticity tag to the other object, would have to be arranged in exactly the same position to one another as they were arranged at the original object in order to maintain the electrical pattern stored in the memory in a version as a comparative quantity. This, however, requires a highly precise and thus costly procedure. Thus, a removal and renewed attachment of the authenticity tag becomes irrelevant from an economical point of view. Additionally, it is quite often not obvious in the inventive approach in which way the electrical pattern is established (i.e. by means of which couplings).

The electrical pattern can, for example, be established by means of characteristic continuity, resistance, capacity or inductivity values for the position of the electrically conductive areas.

The present invention thus offers the advantage of providing a simple and cheap way of increasing the tampering safety of an authenticity tag.

Furthermore, it is possible via the means for communicating at least one of the comparative quantity, the electrically detectable quantity detected and a result of a comparison of the electrically detectable quantity detected and the comparative quantity to the outside to check the authenticity tag externally (i.e. outside the authenticity tag). The comparative quantity can, for example, be read out from the memory via the means for communicating and the memory and transmitted to an external terminal outside. Additionally, the electrically detectable quantity can be detected at the electrically conductive areas via the means for communicating and the means for detecting and be transferred from the authenticity tag to the external terminal. The comparative quantity and the electrically detectable quantity detected must be compared for checking the authenticity tag. Preferably, the authenticity tag is to be recognized as being authentic if the comparative quantity and the electrically detectable quantity detected are in a predetermined relation to each other. Alternatively, the comparison can also take place within the authenticity tag, wherein in this case only the result of the comparison of the electrically detectable quantity detected and the comparative quantity should be communicated to the outside.

When attaching one authenticity tag each to respective different objects, preferably each of the authenticity tags is to be attached in a manner individual for attaching the authenticity tag to the object by coupling at least two electrically conductive areas to each other in a unique way. This has the result that the authenticity tags attached to different objects each comprise unique (i.e. different) couplings of the electrically conductive areas.

It is another advantage that, by using a plurality of electrically conductive areas on the authenticity tag, an electrical pattern having a plurality of parameter values, such as, for example, several continuity, resistance, capacity and/or inductivity values, between the individual electrically conductive areas can be produced. In addition, a reproducibility of the electrical pattern is complicated by increasing the number of parameter values by which the electrical pattern is formed. In contrast to a simple individual electrical connection which can, for example, be repaired by means of a silver-conductive lacquer, this electrical pattern additionally can only be produced with higher expenditure compared to the simple individual electrical connection.

Furthermore, the identification and the checking of the authenticity tag, respectively, are preferably to take place automatically and a user should be able to perform an authenticity tag check himself.

BRIEF DESCRIPTION OF THE DRAWINGS

Preferred embodiments of the present invention will be detailed subsequently referring to the appended drawings, in which:

FIG. 2B shows a cross-section of the embodiment of applying the authenticity tag illustrated in FIG. 2A;

FIG. 3 shows a preferred embodiment of the inventive method for tagging an object with the inventive authenticity tag; and FIG. 4 shows a preferred embodiment of the method for checking the inventive authenticity tag.

DESCRIPTION OF PREFERRED EMBODIMENTS

Figure 1:
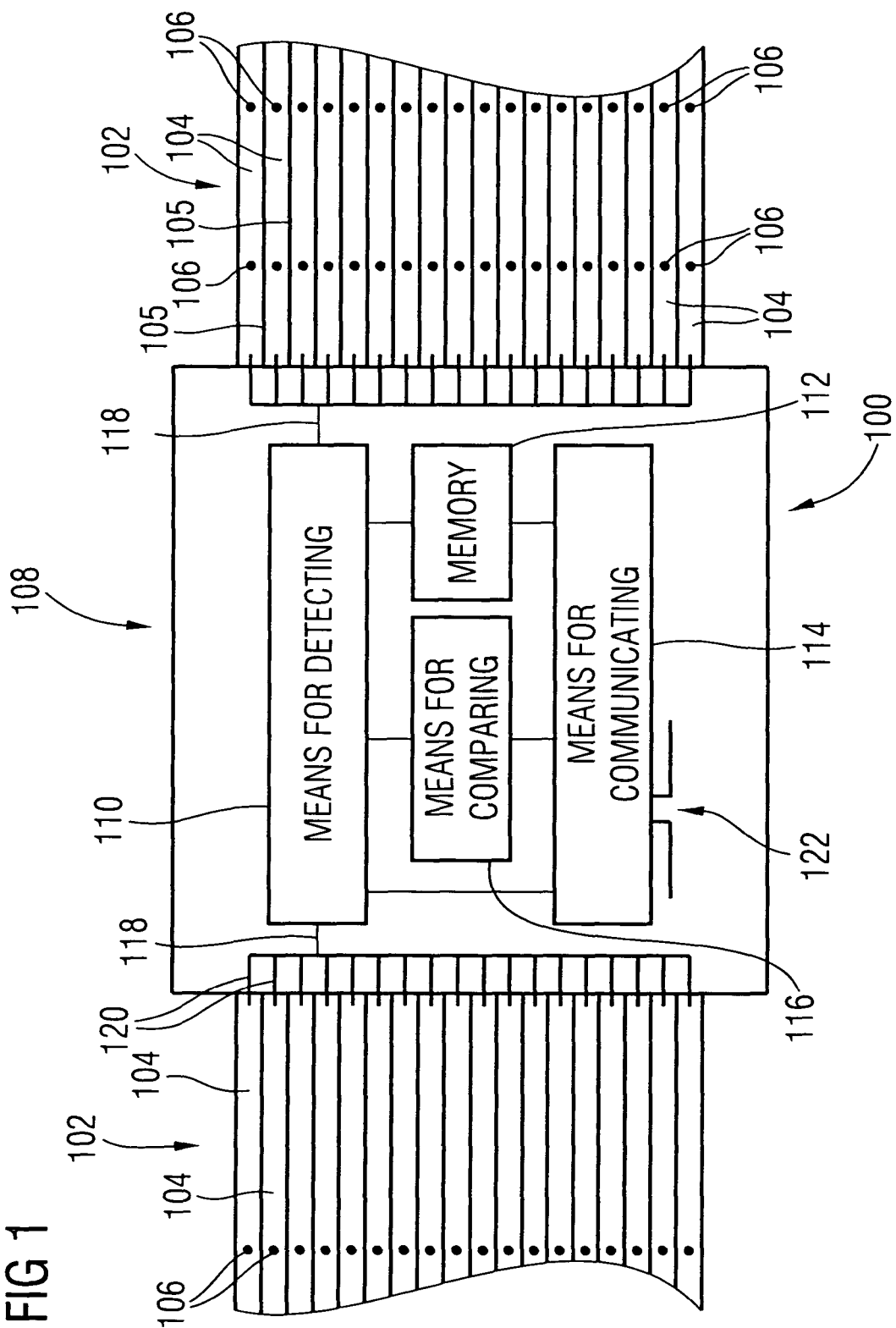
FIG. 1 shows a preferred embodiment of the inventive authenticity tag.

FIG. 1 shows an embodiment of the authenticity tag 100 including a carrier 102 for attachment to an object. The carrier 102 can, for example, include a plastic material (such as, for example, a plastic foil). The object to which the carrier is to be attached can, for example, be an article produced by a manufacturer (such as, for example, brand-name textiles or an original spare part).

The carrier 102 can also include other materials, such as, for example, paper or a textile material. Furthermore, several electrically conductive areas 104 are arranged at the carrier 102. The electrically conductive areas 104 preferably include a metal material which is arranged on the carrier 102 in stripes. The electrically conductive areas 104 are preferably arranged in parallel to one another and electrically separated from one another by a respective insulation area 105. The electrically conductive areas 104 can also be covered by a plastic foil, which is how they are protected from mechanical and chemical environmental influence. Additionally, the authenticity tag 100 comprises at least one adhesive area 106 which, for example, contains a conductive adhesive. Preferably, several adhesive areas 106 are arranged over the electrically conductive areas 104. When the electrically conductive areas 104 are covered by the plastic foil, the plastic foil can comprise openings in which the adhesive is arranged, at those positions where the adhesive regions 106 are arranged, which connects the adhesive areas 106 to the electrically conductive area 104 in a conductive way. When using an electrically conductive adhesive, a contacting of the electrically conductive areas 104 can thus take place via the adhesive areas 106. The adhesive areas 106 can be arranged in spots over the electrically conductive areas 104.

Furthermore, the authenticity tag 100 preferably includes a semiconductor chip 108 connected to the carrier 102. Preferably, the semiconductor chip 108 includes means for detecting 110, a memory 112, means for communicating 114 and means for comparing 116.

The means for detecting 110 is preferably formed to be connected, via a bus system 118, to each of the electrically conductive areas 104 via the electrically connecting lines 120. The means for detecting 110 can thus detect, via the electrical connecting lines 120, continuity, resistance, capacity or inductivity values between, for example, two different ones of the electrically conductive areas 104. The means for detecting 110 is further connected to the means for communicating 114, to the means for comparing 116 and to the memory 112.

The memory 112 is connected to the means for comparing 116 and to the means for communicating 114. The memory 112 preferably includes a non-volatile memory formed as an ROM, PROM, EPROM, EEPROM, flash or by means of fuses. It is thus ensured by preferably forming the memory 112 as a non-volatile memory that the memory contents cannot be deleted unwantedly. Furthermore, the memory 112 is to be formed such that it can only be written on by an authorized institution. The memory 112 or the means for detecting 110 can also include means for an analog-to-digital conversion, not illustrated in FIG. 1, which is formed to digitalize data transmitted from the means for detecting 110 to the memory 112 in an analog form and to store data in a digitalized form in the memory 112 as a comparative quantity.

The means for communicating 114 is connected to the memory 112, the means for comparing 116 and the means 110 for detecting. The means for communicating 114 preferably comprises wireless transmission means 122 which is, for example, formed as an antenna. Via the means for communicating 114, data and energy between the means illustrated in FIG. 1 and the memory 112 can be transmitted from an external device not illustrated to the authenticity tag 100.

The means for comparing 116 is connected to the means for detecting 110, the memory 112 and the means for communicating 114 and is configured to compare data provided by the means for detecting 110 to a comparative quantity provided from the memory 112.

Figure 2A:
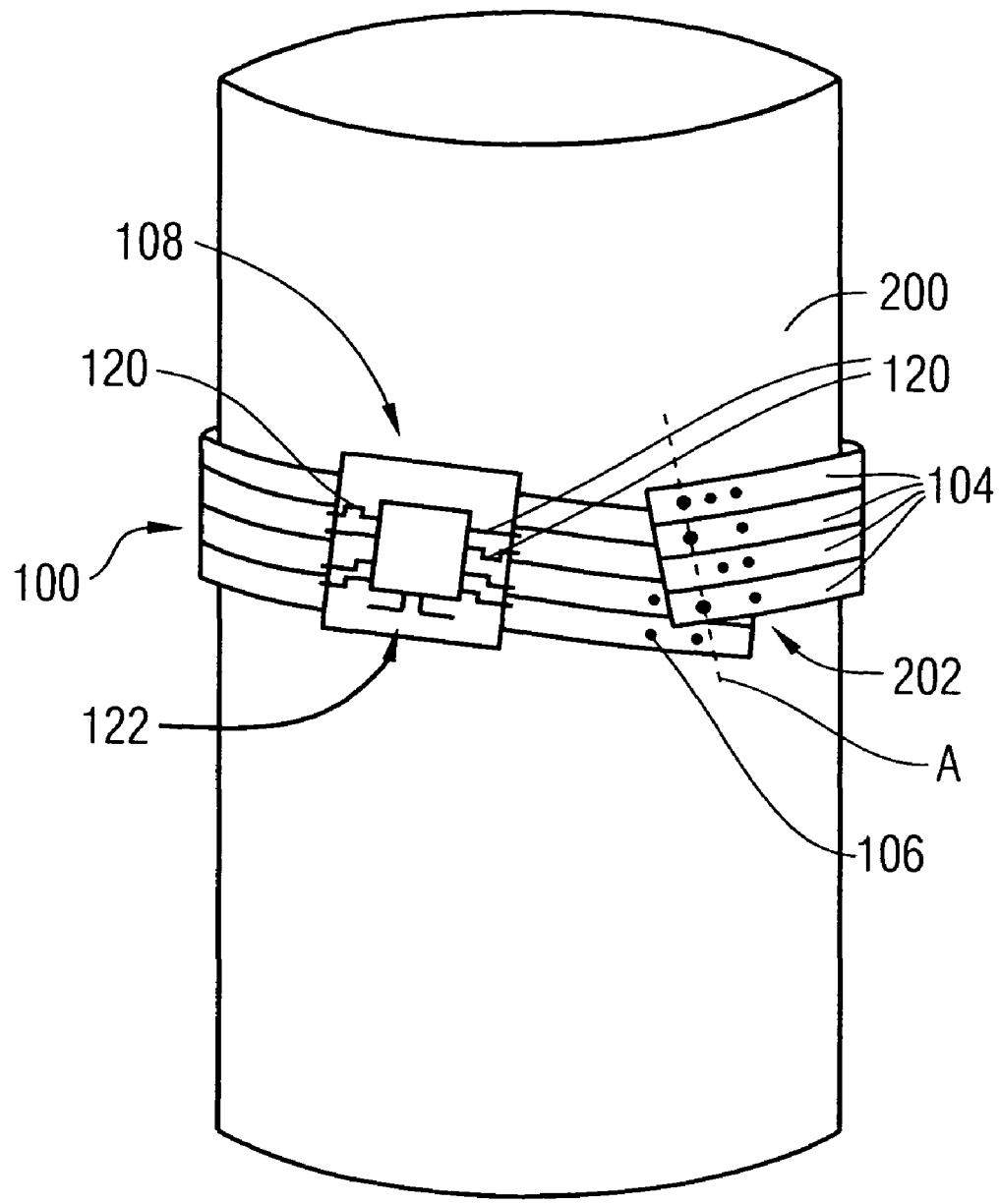
FIG. 2A shows a preferred embodiment of applying the authenticity tag of FIG. 1.

FIG. 2a shows a preferred way of attaching the authenticity tag 100 illustrated in FIG. 1. Here, the authenticity tag 100 is wound around the object 200 (illustrated in FIG. 2A as a cylindrical object 200). The authenticity tag 100 illustrated in FIG. 2A differs, for reasons of illustration, from the authenticity tag 100 illustrated in FIG. 1 only by a smaller number of electrically conductive areas 104 and by the absence of the bus system 118 illustrated in FIG. 1. For reasons of clarity, the detailed illustration of the means formed in the semiconductor chip 108 and of the memory 112 is dispensed with.

As is illustrated in FIG. 2A, the authenticity tag 100 has been wound around the object 200 with an offset (or a twist) so that several of the electrically conductive areas 104 overlap in the overlapping area 202. The permanent attachment of the authenticity tag 100 to the object 200 for example takes place by sticking the overlapping electrically conductive areas 104 to one another in the overlapping area 202. As has been described above, a conductive connection between the overlapping electrically conductive areas 104 can be formed by using the conductive adhesive in the adhesive area 106. In case the electrically conductive areas 104 are covered by the plastic foil, the plastic foil preferably comprises openings in which the adhesive areas 106 are arranged at those areas where there are the adhesive areas 106. In addition, specific capacities are formed at those areas in the overlapping region 202 where the electrically conductive areas 104 are electrically separated from the underlying electrically conductive areas 104 (for example by means of the plastic foil). These specific capacities between two electrically conductive areas 104 arranged one above the other are characterized by the areas where the two electrically conductive areas 104 are arranged one above the other and thus form area capacities. By means of the overlying or underlying electrically conductive areas 104 in the overlapping area 202, inductivity values between neighboring electrically conductive areas 104 can still be produced by means of a cross-coupling behavior.

FIG. 2B shows a cross-section of the embodiment, illustrated in FIG. 2A, of the inventive authenticity tag at the sectional line A illustrated in FIG. 2A. The cross-section in FIG. 2B thus shows a carrier 102, whose parts are arranged on top of each other with an offset, which comprises four electrically conductive areas 104. The individual electrically conductive areas 104 on a carrier 102 are separated by the insulation areas 105. In addition, a plastic foil 204 is arranged on one side of the electrically conductive areas 104 and the insulation areas 105. The plastic foil 204 comprises openings in which adhesive areas 106 (which preferably include a conductive adhesive or sticking material) are arranged. By arranging the carrier 102 parts on top of each other, electrically conductive connections between different ones of the electrically conductive areas 104 are produced via the conductive adhesive areas 106. By the fact that a plurality of adhesive areas 106 are arranged on the electrically conductive areas 104, there are, through the twisting or offset of the carrier 102, a plurality of different coupling possibilities between the electrically conductive areas 104 of the carrier 102. Furthermore, a capacitive or inductive coupling behavior which is basically characterized by the respective areas of the electrically conductive areas 104, lying above one another, forms between those electrically conductive areas 104 not connected in an electrically conductive way by an adhesive area 106.

As an alternative to the arrangement illustrated in FIG. 2B, the electrically conductive areas 104 can also be covered by a plastic foil 204 on both sides. In this case, it must be ensured that different ones of the electrically conductive areas 104 can be coupled by adhesive areas 106 in an electrically conductive way and capacitively or inductively, respectively. This can, for example, be achieved when the plastic foils 204 arranged on both sides of the electrically conductive areas 104 comprise openings on both sides in which the conductive adhesive material of the adhesive area 106 is arranged. It should also be made sure in such a case, that the respective adhesive areas 106 are in contact for forming the electrically conductive connection between two different electrically conductive areas 104 and thus form the electrically conductive connection. In order to form a sufficient number of electrically conductive connections between different ones of the electrically conductive areas 104, it is particularly desirable here to provide as many or as large adhesive areas as possible in order to ensure a sufficiently high probability for the electrically conductive connection to form.

FIG. 3 shows the steps of a preferred embodiment for tagging an object with the authenticity tag. In a first step 302, the authenticity tag is attached to an object which is, for example, an article of a manufacturer. The mounting of the authenticity tag thus for example takes place by wrapping it around an object, wherein preferably two of the electrically conductive areas are in contact or are arranged one above the other or next to each other. When using an electrically conductive adhesive material, a conductive connection between two of the electrically conductive areas can for example be produced by attaching the authenticity tag, which is how a specific resistance between the two electrically conductive areas connected in an electrically conductive way is formed. This specific resistance has a value depending on the position of the connection between the two electrically conductive areas. If no conductive connections between individual ones of the electrically conductive areas are produced by attaching the authenticity tag to the object, at least when the electrically conductive areas are arranged one above the other or next to each other, a detectable capacitive or inductive coupling behavior results, which is characteristic for the position of the electrically conductive areas arranged one above the other or next to each other. Furthermore, it can also be determined by means of a continuity value whether there is an electrically conductive connection between two electrically conductive areas at all. In this way, an electrical pattern is formed when attaching the authenticity tag to the object, wherein the pattern can be characterized by means of at least one of a continuity, a resistance, a capacity and an inductivity value.

A read-out signal is transmitted in a subsequent step 304 from an external tagging device to the authenticity tag. Responsive to the externally provided read-out signal, the electrically detectable quantity (i.e. the electrical pattern) at the electrically conductive areas can, after attaching the authenticity tag to the object, be detected for example by the means for detecting illustrated in FIG. 1. The reception of the externally provided read-out signal preferably takes place by the means for communicating illustrated in FIG. 1.

The electrical pattern can thus be detected via the means for detecting by detecting the resistance, capacity or inductivity values between the individual electrically conductive areas. This can, for example, take place by means of a low-frequency continuity and resistance measurement between two electrically conductive areas or by a high-frequency capacity or inductivity measurement between two of the electrically conductive areas. The energy required for such a measurement in the means for detecting can, for example, be provided from the external tagging device via the wireless transmission means and the means for communicating to the means for detecting. A passive authenticity tag can thus be realized, which is why a separate power supply of the authenticity tag can be omitted and the authenticity tag can be operated at low cost.

In a subsequent fourth step 308, an analog-to-digital conversion of the electrically detectable quantity detected takes place. The analog-to-digital conversion of the electrically detectable quantity detected can preferably take place in the means for detecting illustrated in FIG. 1 or in the memory illustrated in FIG. 1. The electrically detectable quantity is thus subjected to a transformation into a version differing from an original version in which the electrical quantity was originally detected by the means for detecting. The analog-to-digital conversion can additionally optionally include an encryption with a key of a symmetrical or asymmetrical encrypting method.

In a fifth step 310 following the fourth step 308, a version of the electrically detectable quantity detected is stored in the memory as a comparative quantity. By storing the comparative quantity in the (preferably non-volatile) memory, the position of the individual electrically conductive areas is thus detected and stored in an implicit form. In case the step of the analog-to-digital conversion includes encrypting the analog-to-digital-converted, electrically detectable quantity detected with a key of an encryption algorithm, the fifth step 310 entails storing the encrypted version of the analog-to-digital-converted, electrically detectable quantity detected in the memory as a comparative quantity. As an auxiliary measure, a key matching the key used, for decrypting the encrypted version of the analog-to-digital-converted, electrically detectable quantity detected can be stored in the memory.

If the authenticity tag is removed from the object to which it has been attached and is mounted to another object, the electrically conductive areas 104 of the authenticity tag would have to be arranged again in the same position to one another in order to maintain the electrical pattern which is stored in the memory in a version as a comparative quantity. This, however, in particular when using a high number of electrically conductive areas and, for example, a small strip-width of the electrically conductive areas, is only possible when the position of the electrically conductive connections is known and the procedure is highly precise. Often, knowing the position of the electrically conductive connections is, however, problematic. In addition, such a highly precise procedure is very expensive, which is why the removal and renewed attachment of the authenticity tag to another object is ineffective from an economical point of view. As an addition safety measure, the authenticity tag can be attached to the object such that each attachment of the authenticity tag to an object is individual. This means that a first electrical pattern is formed when attaching a first authenticity tag to a first object, while a second electrical pattern is for example formed by attaching a second authenticity tag to a second object, the second electrical pattern differing from the first electrical pattern. Tampering with of the authenticity tag is additionally made more difficult by such a procedure in that a different electrical pattern is stored in the memory as a comparative quantity in each authenticity tag. In this way tampering with an authenticity tag becomes even more difficult.

FIG. 4 shows the steps of a preferred embodiment of the inventive method for checking an authenticity tag. At first, an enquiry signal is to be transmitted to the authority tag in a first step 402 by an external checking device (such as, for example, by a terminal, a tag reader or even a mobile telephone). This enquiry signal can be transmitted either in a wireless way when the authenticity tag includes a wireless transmission, or can take place by an electrical contact via which the means for communicating can be contacted. The read-out signal can, for example, be formed by an enquiry sequence sent from a mobile telephone of a potential customer of an article of a manufacturer provided with the authenticity tag.

The means for communicating, in a second step 404, responsive to the read-out signal received, causes the electrical pattern to be detected by the means for detecting. As has been discussed above, the electrical pattern is formed by resistance, capacity or inductivity values resulting from a position of the electrically conductive areas to one another. The detection of the electrically detectable quantity can again take place by measuring at least one of a resistance, a capacity and an inductivity value at one of the electrically conductive areas.

In another step 406, an analog-to-digital conversion of the electrically detectable quantity detected takes place. The analog-to-digital conversion can thus take place either by the means for detecting shown in FIG. 1 or by the means for comparing illustrated in FIG. 1.

The fourth step 408 of the inventive method for checking an authenticity tag can take place in parallel to the second step 404 and the third step 406, where the comparative quantity is read out from the memory. If a version encrypted with a key of an encryption algorithm of an analog-to-digital-converted, electrically detectable quantity detected is stored in the memory, the step of reading out the comparative quantity from the memory should include decrypting the comparative quantity. A corresponding key which is preferably to be transferred via the means for communicating must be provided for this. This can preferably take place by retrieving a public key from a key database by means of the mobile telephone utilized or the tag reader. Alternatively, the (preferably public) key can be read out from the memory if the key to be used for decrypting is stored in the memory.

The analog-to-digital-converted, electrically detectable quantity detected and the read-out (and maybe decrypted) comparative quantity are then compared to each other in a fifth step 410. This preferably takes place in the means for comparing illustrated in FIG. 1.

In a sixth step 412, a result of the comparison performed in the means for comparing is communicated to the outside. Here, the authenticity tag can be referred to as being authentic if a predetermined portion of the contents of the comparative quantity matches the analog-to-digital-converted, electrically detectable quantity detected. In this case, the authenticity tag is evaluated as "not removed". In this case the potential customer of the article can assume that the authenticity tag has not been removed from the object to which it was originally attached. The chance that the authenticity tag has been removed but attached again in an attachment identical to the original attachment is very low and thus need not be taken into consideration. A result of the comparison between the comparative quantity and the electrically detectable quantity detected can also be signaled from the authenticity tag via the means for communicating.

As an alternative to the above description, the means for detecting, responsive to the enquiry signal, can also be configured to transmit the detected electrical quantity to the means for communicating. In such a case, the memory, responsive to the enquiry signal, is also configured to transmit the comparative quantity to the means for communicating. The means for communicating subsequently transmits the electrically detectable quantity detected (i.e. the detected electrical pattern) and the comparative quantity to an external device for checking the authenticity tag not illustrated in FIG. 1. The comparison of the electrically detectable quantity detected and the comparative quantity can then take place in the external device for checking the authenticity tag. Means for comparing can be omitted in such a scenario. This scenario also has the advantage that the comparison of the electrically detectable quantity detected and the comparative quantity can take place outside the authenticity tag by means of a trustworthy device.

The inventive approach provides a simple and cheap way of increasing the tampering safety of an authenticity tag. In particular by preventing a constant monitoring, as was, for example, necessary in the prior art, a considerable cost reduction can be realized due to the fact that a special energy supply of the authenticity tag can be dispensed with. In addition, the reproducibility of an identical authenticity tag can be made considerably more difficult by the complex positioning of the individual electrically conductive areas to one another, which contributes to a further increase in the tampering safety.

Depending on the circumstances, the inventive, methods can be implemented in either hardware or software. The implementation can be on a digital storage medium, in particular on a floppy disc or a CD with a control signal which can be read out electronically, which can cooperate with a programmable computer system to execute the corresponding methods. In general, the invention also includes a computer program product having a program code stored on a machine-readable carrier, for performing the inventive method when the computer program product runs on a computer. Put differently, the invention can also be realized as a computer program having a program code for performing one of the methods when the computer program runs on a computer.

In summary, the invention, according to a preferred embodiment, includes a sticker provided with a memory chip/RFID tag generating an electrical pattern when being attached, which is unique and stored in the chip. When this sticker is removed, the pattern can no longer be reproduced. In contrast to a simple individual electrical connection which could, for example, be repaired with a silver-conductive lacquer, the electrical pattern produced cannot be reproduced easily after being removed from the original object.

Preferably, the sticker is made of a plastic material onto which a plurality of parallel metallically-structured patterns are applied, which are preferably provided with a conductive adhesive. When the sticker is applied, this should take place such that two portions of the sticker are placed one above another, which is how electrically conductive connections form. The chip evaluates the number and position of these conductive connections and stores them internally. The chip will then only be classified as being authentic if a sufficient percentage of the conductive connections is still active when being testing by the chip (i.e. if the electrically conductive connections still exist). In this case, the sticker is evaluated as being "not removed". In this case, the chip passes on a signal confirming the authenticity to a reader signaling the authenticity to the potential customer.

As an alternative, several authenticity tags together can be attached to an object. This preferably takes place in the case that the object to which the authenticity tag is attached is a flat object (such as, for example, a CD cover). The attachment of the authenticity tag thus preferably takes place by sticking electrically conductive areas which are part of different authenticity tags one above the other. In this case, the electrical pattern is realized by electrically connecting the electrically conductive areas of the different authenticity tags.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An authenticity tag comprising:
a carrier for attachment to an object;

wherein the carrier comprises a plurality of electrically conductive areas, and a plurality of adhesive areas arranged in electrical contact with respective electrically conductive areas, the plurality of adhesive areas comprising a conductive adhesive material, wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and a controller attached to the carrier, comprising:

a detector configured to detect an electrically detectable quantity at the electrically conductive areas;

a memory configured to store a comparative quantity representing the unique electrically detectable pattern occurring when the authenticity tag is attached to the object; and a communicator configured to communicate the comparative quantity and the electrically detectable quantity detected or a result of a comparison between the electrically detectable quantity detected and the comparative quantity.

2. The authenticity tag according to claim 1, wherein the memory is a non-volatile memory.

3. The authenticity tag according to claim 1, wherein the memory is arranged in a semiconductor chip.

4. The authenticity tag according to claim 3, wherein the memory can only be written on by an authorized institution.

5. The authenticity tag according to claim 3, wherein the communicator is arranged in the semiconductor chip.

6. The authenticity tag according to claim 1, wherein the communicator includes a wireless transmitter.

7. The authenticity tag according to claim 1, wherein the detector is formed to detect at least one electrically detectable quantity selected from the group consisting of a continuity, a resistance, a capacity and an inductivity value between at least two of the electrically conductive areas.

8. The authenticity tag according to claim 1, wherein at least one electrically conductive area is covered by a plastic foil.

9. The authenticity tag according to claim 8, wherein the plastic foil comprises openings at those positions where the carrier comprises an adhesive area.

10. The authenticity tag according to claim 1, wherein the electrically conductive areas basically have a form of stripes and are arranged in parallel to one another.

11. The authenticity tag according to claim 1, wherein the comparative quantity is formed by a version of the electrically detectable quantity detected.

12. A method for operating an authenticity tag, the authenticity tag comprising a carrier for attachment to an object, a plurality of electrically conductive areas, and a controller connected to the carrier, the controller comprising: a detector configured to detect an electrically detectable quantity at the electrically conductive areas, a memory configured to store a comparative quantity, and a communicator configured to communicate the comparative quantity and the electrically detectable quantity detected or a result of a comparison of the electrically detectable quantity detected and the comparative quantity, comprising:

detecting an electrically detectable quantity at at least one of the electrically conductive areas;

addressing the memory to read out a comparative quantity stored in the memory from the memory; and communicating at least the electrically detectable quantity detected or result of a comparison of the comparative quantity and a version of the electrically detectable quantity detected, wherein the carrier comprises the plurality of electrically conductive areas, and a plurality of adhesive areas arranged in electrical contact with respective electrically conductive areas, the plurality of adhesive areas comprising a conductive adhesive material, wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas, and the comparative quantity represents the unique electrically detectable pattern occurring when the authenticity tag is attached to the object.

13. The method according to claim 12, wherein the step of detecting includes measuring at least one electrically detectable quantity selected from the group consisting of a resistance, a capacity and an inductivity value.

14. The method according to claim 12, wherein the step of storing the comparative quantity in the memory or the step of detecting the electrically detectable quantity at the electrically conductive area includes analog-to-digital conversion of the electrically detectable quantity.

15. A device for tagging an object with an authenticity tag, the authenticity tag comprising a carrier for attachment to an object, a plurality of electrically conductive areas and a controller connected to the carrier, comprising:

a detector configured to detect an electrically detectable quantity at an electrically conductive areas;

electrically detectable quantity detected as a comparative quantity in the memory; and a communicator configured to communicate the comparative quantity and the electrically detectable quantity detected or a result of a comparison of the electrically detectable quantity detected and the comparative quantity, wherein the carrier comprises a plurality of electrically conductive areas, and a plurality of adhesive areas arranged in electrical contact with respective electrically conductive areas, the plurality of adhesive areas comprising a conductive adhesive material, wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and wherein the comparative quantity represents the unique electrically detectable pattern occurring when the authenticity tag is attached to the object, and wherein the authenticity tag is attached to the object.

16. The device for tagging according to claim 15, wherein the carrier is formed so that at least two of the electrically conductive areas are stuck together using the adhesive area.

17. The device for tagging according to claim 15, wherein an attacher is configured to attach a first authenticity tag to a first object and a second authenticity tag to a second, object, wherein, by the attacher, at least two of the electrically conductive areas of the first authenticity tag can be coupled to each other to provide a first pattern and at least two of the electrically conductive areas of the second authenticity tag can be coupled to each other to provide a second pattern, the first pattern differing from the second pattern.

18. The device for tagging according to claim 15, wherein the detector is formed to detect at least one electrically detectable quantity selected from the group consisting of a resistance, a capacity and an inductivity value.

19. The device for tagging according to claim 15, which is configured to emit a read-out signal to the authenticity tag.

20. The device for tagging according to claim 15, wherein the detector is formed in the authenticity tag.

21. The device for tagging according to claim 15, wherein the storage is formed in the authenticity tag.

22. The device for tagging according to claim 15, which is configured to perform analog-to-digital conversion of the electrically detectable quantity detected by the detector.

23. The device for tagging according to claim 15, which is configured to encrypt a version of the detected, electrically detectable quantity with a key of an encrypting algorithm.

24. A method for tagging an object with an authenticity tag, the authenticity tag comprising a carrier for attachment to an object, a plurality of electrically conductive areas, and a controller connected to the carrier, the controller comprising a detector configured to detect an electrically detectable quantity at the electrically conductive areas, a memory configured to store a comparative quantity, and a communicator configured to communicate the comparative quantity and the detected, electrically detectable quantity or a result of a comparison of the electrically detectable quantity detected and the comparative quantity, comprising:

attaching the authenticity tag to the object;

detecting an electrically detectable quantity at at least one electrically conductive area; and storing a version of the electrically detectable quantity detected in the memory as the comparative quantity wherein the carrier comprises a plurality of electrically conductive areas, and a plurality of adhesive areas arranged in electrical contact with respective electrically conductive areas, the plurality of adhesive areas comprising a conductive adhesive material, and wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and wherein the comparative quantity represents the unique electrically detectable pattern occurring when the authenticity tag is attached to the object.

25. The method for tagging according to claim 24, wherein storing the electrically detectable quantity detected in the memory takes place in a binary form.

26. A device for checking an authenticity tag, the authenticity tag comprising a carrier for attachment to an object, a plurality of electrically conductive areas and a controller connected to the carrier, the controller comprising a detector configured to detect an electrically detectable quantity at the electrically conductive areas, a memory configured to store the comparative quantity and a communicator configured to communicate the electrically detectable quantity detected or a result of a comparison of the electrically detectable quantity detected and the comparative quantity, comprising:

a comparer configured to compare the comparative quantity and the electrically detectable quantity detected to obtain the result of a comparison; and a checker configured to check the result of the comparison and for signaling an authenticity in a case in which the comparative quantity and the electrically detectable quantity detected are in a predetermined relation to each other, wherein the carrier comprises a plurality of electrically conductive areas, and a plurality of adhesive areas arranged in electrical contact with respective electrically conductive areas, the plurality of adhesive areas comprising a conductive adhesive material, and wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angle corresponding to a unique combination of joined conductive areas and conductive adhesive areas; and wherein the comparative quantity represents the unique electrically detectable pattern occurring when the authenticity tag is attached to the object.

27. The device for checking an authenticity tag according to claim 26, wherein the predetermined relation includes at least partial contents matching of the comparative quantity and the version of the electrically detectable quantity detected.

28. The device for checking an authenticity tag according to claim 26, wherein the comparer is formed in the authenticity tag.

29. The device for checking an authenticity tag according to claim 26, wherein the checker is formed in the authenticity tag.

30. The device for checking an authenticity tag according to claim 26, wherein an activation signal can be provided by the checker and wherein the controller of the authenticity tag is configured to provide the comparative quantity and the electrically detectable quantity detected to the comparer responsive to the activation signal.

31. A method for checking an authenticity tag, the authenticity tag comprising a carrier for attachment to an object, a plurality of electrically conductive areas, and a controller connected to the carrier, the controller including comprising a detector configured to detect an electrically detectable quantity at the electrically conductive areas, a memory configured to store a comparative quantity, and a communicator configured to communicate the comparative quantity and the electrically detectable quantity detected or a result of a comparison of the electrically detectable quantity detected and the comparative quantity, comprising:
    comparing the comparative quantity and the electrically detectable quantity detected in order to obtain the result of the comparison; and
    checking the result of the comparison and signaling an authenticity in a case in which the comparative quantity and the electrically detectable quantity detected are in a predetermined relation to each other,
    wherein the carrier comprises a plurality of electrically conductive areas, and a plurality of adhesive areas arranged in electrical contact with respective electrically conductive areas, the plurality of adhesive areas comprising a conductive adhesive material,
    wherein the plurality of electrically conductive areas and the plurality of adhesive areas are formed such that a unique electrically detectable pattern between two respective ones of the plurality of the plurality of electrically conductive area via an adhesive area of the plurality adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and wherein the comparative quantity represents the unique electrically detectable pattern occurring when the authenticity tag is attached to the object.

32. A computer program having a program code stored in a computer readable medium for performing a method for operating an authenticity tag, the authenticity tag comprising a carrier for attachment to an object, a plurality of electrically conductive areas, and a controller connected to the carrier, the controller comprising a detector configured to detect an electrically detectable quantity at the electrically conductive areas,
    a memory configured to store a comparative quantity, and a communicator configured to communicate the comparative quantity and the electrically detectable quantity detected or a result of a comparison of the electrically detectable quantity detected and the comparative quantity, comprising the steps of:
    detecting an electrically detectable quantity at at least one of the electrically conductive areas;
    addressing the memory to read out a comparative quantity stored in the memory from the memory;
    communicating at least the comparative quantity and the electrically detectable quantity detected or a result of a comparison of the comparative quantity and a version of the electrically detectable quantity detected when the program runs on a computer,
    wherein the carrier comprises a plurality of electrically conductive areas, and a plurality of adhesive areas arranged in electrical contact with respective electrically conductive areas, the plurality of adhesive areas comprising a conductive adhesive material, and wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and wherein the comparative quantity represents the unique electrically detectable pattern occurring when the authenticity tag is attached to the object.

33. A computer program having a program code stored in a computer readable medium for performing a method for tagging an object with an authenticity tag, the authenticity tag comprising a carrier for attachment to an object, a plurality of electrically conductive areas, and a controller connected to the carrier, the controller comprising a detector configured to detect an electrically detectable quantity at the electrically conductive areas, a memory configured to store a comparative quantity, and a communicator configured to communicate the comparative quantity and the detected, electrically detectable quantity or a result of a comparison of the electrically detectable quantity detected and the comparative quantity, comprising:
    attaching the authenticity tag to the object;
    detecting an electrically detectable quantity at least one of the electrically conductive areas; and
    storing a version of the electrically detectable quantity detected in the memory as the comparative quantity when the program runs on a computer,
    wherein the carrier comprises a plurality of electrically conductive areas, and a plurality of adhesive areas arranged in electrical contact with respective electrically conductive areas, the plurality of adhesive areas comprising a conductive adhesive material, and wherein the plurality of electrically conductive areas and the plurality of adhesive areas are formed such that a unique electrically detectable pattern between two respective ones of the detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlap, transverse overlaps and angles corresponding to a unique combination of joined conductive areas and conductive adhesive areas; and
    wherein the comparative quantity represents the unique electrically detectable pattern occurring when the authenticity tag is attached to the object.

34. A computer program having a program code stored in a computer readable medium for performing a method for checking an authenticity tag, the authenticity tag comprising a carrier for attachment to an object, a plurality of electrically conductive areas, and a controller connected to the carrier, the controller comprising a detector configured to detect an electrically detectable quantity at the electrically conductive areas,
    a memory configured to store a comparative quantity, and a communicator configured to communicate the comparative quantity and the electrically detectable quantity detected or a result of a comparison of the electrically detectable quantity detected and the comparative quantity, comprising:

comparing the comparative quantity and the electrically detectable quantity detected in order to obtain the result of the comparison; and checking the result of the comparison and signaling an authenticity in a case in which the comparative quantity and the electrically detectable quantity detected are in a predetermined relation to each other when the program runs on a computer, wherein the carrier comprises a plurality of electrically conductive areas, and a plurality of adhesive areas arranged in electrical contact with respective electrically conductive areas, the plurality of adhesive areas comprising a conductive adhesive material, wherein the plurality of electrically conductive areas and the plurality of adhesive areas are formed such that a unique electrically detectable pattern between two respective ones of the plurality of electrically conductive areas via an adhesive area of the plurality of adhesive areas is formed when the authenticity tag is attached to the object, by wrapping around the object such that the two ends of the carrier comprising the conductive areas and the conductive adhesive areas join together at a plurality of possible attachment longitudinal overlaps, transverse overlaps and angles corresponding to a unique combination of joined conductive areas and conductive adhesive areas; and wherein the comparative quantity represents the unique electrically detectable pattern occurring when the authenticity tag is attached to the object.

35. An authenticity tag comprising:

a carrier for attachment to an object;

wherein the carrier comprises a plurality of electrically conductive areas and a plurality of adhesive area, the plurality of adhesive areas being arranged in contact with respective electrically conductive areas, the plurality of adhesive areas comprising a conductive adhesive material, and wherein at least one electrically conductive area is covered by a plastic foil, the plastic foil comprising openings at positions, in which the carrier comprises an adhesive area, and wherein the plurality of electrically conductive areas and the plurality of adhesive areas are formed such that a unique electrical detectable pattern between two respective ones of the plurality of electrically conductive areas via an adhesive area opening of the plurality of adhesive areas openings is formed when the authenticity tag is attached to the object by wrapping around the object such that the two ends of the carrier comprising the conductive areas and the conductive adhesive areas join together at a plurality of the openings of the adhesive areas corresponding to a unique combination of joined conductive areas and conductive adhesive areas;

a controller attached to the carrier, comprising:

a detector configured to detect an electrically detectable quantity at the electrically conductive areas;

a memory configured to store a comparative quantity; and a communicator configured to communicate the comparative quantity and the electrically detectable quantity detected or a result of a comparison between the electrically detectable quantity detected and the comparative quantity.

* * * * *